US006409595B1

(12) United States Patent
Uihlein et al.

(10) Patent No.: US 6,409,595 B1
(45) Date of Patent: Jun. 25, 2002

(54) LIGHTED KEYPAD ASSEMBLY AND METHOD FOR A PLAYER TRACKING SYSTEM

(75) Inventors: Mark Uihlein, Henderson; Robert H. Carson, Jr., Sparks; Tracy Powell, Reno, all of NV (US)

(73) Assignee: International Game Technology, Reno, NV (US)

( * ) Notice: Subject to any disclaimer, the term of this patent is extended or adjusted under 35 U.S.C. 154(b) by 0 days.

(21) Appl. No.: 09/430,242

(22) Filed: Oct. 29, 1999

(51) Int. Cl.$^{7}$ ................................................ G06F 17/00
(52) U.S. Cl. .................................... 463/29; 340/825.36
(58) Field of Search .............................. 463/29, 25, 36; D14/383–400; 235/382, 382.5, 380, 375; 340/825.36, 5.1, 5.3, 5.4, 5.8, 286.1, 323 R; 446/141, 143; 702/1, 2; 705/1, 14, 16, 17, 39–44, 64, 67; 700/90–93; 273/148 R, 148 B

(56) References Cited

U.S. PATENT DOCUMENTS

| | | | | | |
|---|---|---|---|---|---|
| 4,502,048 | A | * | 2/1985 | Rehm | 340/825.1 |
| 5,305,197 | A | * | 4/1994 | Axler et al. | 364/401 |
| 5,326,104 | A | * | 7/1994 | Pease et al. | 273/138 A |
| 5,429,361 | A | * | 7/1995 | Raven et al. | 273/138 A |
| 5,702,304 | A | * | 12/1997 | Acres et al. | 463/29 |
| 5,736,942 | A | * | 4/1998 | Randolf | 341/22 |
| 5,836,818 | A | * | 11/1998 | Jones et al. | 463/29 |

FOREIGN PATENT DOCUMENTS

| | | | | |
|---|---|---|---|---|
| FR | 2785475 | * | 5/2000 | G06F/3/00 |
| WO | WO-95/12841 | * | 5/1995 | G06F/3/02 |

* cited by examiner

*Primary Examiner*—Mark Sager
*Assistant Examiner*—Steven Ashburn
(74) *Attorney, Agent, or Firm*—Beyer Weaver & Thomas, LLP

(57) ABSTRACT

A keypad assembly and method for use with a card reader adapted to receive and read a player identification card therein. The keypad assembly includes a keypad mechanism having a plurality of keys to input data, and a feedback mechanism coupled to the keypad. A validation device is provided which is adapted to determine the validation of information relating to the identification card upon reading thereof in the card reader. The validation device is further operably coupled to the feedback mechanism to visually inform the Player that the information relating to identification card has been validated.

55 Claims, 11 Drawing Sheets

LIGHTED KEYPAD ASSEMBLY AND METHOD FOR A PLAYER TRACKING SYSTEM

TECHNICAL FIELD

This present invention relates, generally, to player tracking systems for gaming devices and, more particularly, relates to keypad and card reader devices for player tracking systems.

BACKGROUND ART

As technology in the gaming industry progresses, the once traditional mechanically-driven reel slot machines have been replaced with electronic counterparts having CRT video displays or the like. These video/electronic gaming advancements enable the operation of more complex gambling games which would not otherwise be possible on mechanical-driven gambling machines. For example, in addition to reel slot machines, it is now common to observe stand alone or multiple platform video electronic games including Keno, Blackjack, Poker, Pai Gow, and all the variations thereof, in even the smallest gaming establishments.

These electronic game devices are also commonly interconnected to a host computer through a network system. Such intercommunication has several advantages which include competitive gaming machine play, and additional and more complex bonusing schemes to entice Players to participate. Another benefit derived from these networked systems is the collection of accounting data such as the usage and payout of each gaming machine which allows the gaming establishment to immediately assess their profitability. Typical of such patented systems may be found in U.S. Pat. No. 5,470,079 to LeStrange et al.; and U.S. Pat. No. 4,283,709 to Lucero et al.

Another primary advantage of these networked gaming devices is the ability to collectively track the individual Player use of the gaming devices. player tracking, for instance, allows the gaming establishment to monitor individual Player use for accounting and advertising purposes. As an incentive to return, the gaming establishment often awards complimentary meals, rooms and event tickets to the Player An example of such systems include U.S. Pat. Nos. 5,655,961; 5,702,304; 5,741,183; and U.S. Pat. No. 5,752,882 to Acres et al.; and U.S. Pat. No. 5,761,647 to Boushy.

Generally, each participating Player is issued an individual player tracking card which incorporates a unique player identification code corresponding to the customer's account. Upon insertion of the player tracking card into a card reader at a respective gaming machine, the unique identification code is extracted from the card and transmitted to the host computer to commence tracking of the Player's gaming activity. Subsequently, the host computer updates the customer's account to reflect the new activity.

Occasionally, the Player inserts the player tracking card into the card reader slot incorrectly. Should the customer begin play of the game while the identification card is incorrectly inserted, the player tracking data will not be properly recorded. Consequently, the Player's activity will not be credited to their account and will thus be lost, while the gaming establishment's records will be incomplete.

In an attempt to notify the Player of the status of their card insertion, a light emitting diode (LED) or the like is often mounted to the card reader or on the gaming device in close proximity to the display screen. Typically, once the proper card insertion is verified, the diode is illuminated to inform the Player that the identification card has been properly inserted. One problem associated with this approach, however, is that the bright lighting in the gaming establishments often overpower the visualization of the relatively dim LEDs. Accordingly, even if the status of the card insertion is indicated to be incorrect, the Player may not even notice.

U.S. Pat. No. 5,702,304 to Acres et al. attempts to overcome this deficiency by back lighting the large bezel surrounding the card reader opening of the card reader. Upon a proper identification of the code embedded in the Player's card, the large bezel will be back lit in one color, while an improper identification will cause the bezel to be back lit in another color.

While this solution is satisfactory in many instances, the patron is required to visually observe the card reader for verification. This momentary delay may be annoying for anxious Players, especially for those who switch gaming machines frequently. Moreover, the newer player tracking systems may require the input of additional information from a keypad mechanism which may be spaced away from the card reader. In these instances, the anxious Player may quickly insert their player tracking card and begin keying in this additional information before ever observing the status indication at the card reader.

Accordingly, in view of the above observations, it would be desirable to provide a player tracking system which simplifies the visual observation of the player tracking card insertion status to the Player.

DISCLOSURE OF INVENTION

The present invention provides a keypad assembly for use with a card reader adapted to receive and read a player identification card therein. The keypad assembly includes a keypad mechanism having a plurality of keys to input data, and a feedback mechanism coupled to the keypad. A validation device is provided which is adapted to determine the validation of information relating to the identification card upon reading thereof in the card reader. The validation device is further operably coupled to the feedback mechanism to visually inform the Player that the information relating to identification card has been validated.

The present invention, therefore, allows the Player to visually determine the validation of the information directly at the keypad mechanism. This facilitates system efficiency since the customer no longer has to observe the card reader for verification before turning their attention to the keypad mechanism. Such information, for example, may relate to the identification cards such as the verification of proper card insertion or of the validation of the input of the Personal Identification Number (PIN).

In one embodiment, the validation device provides a first lighting mode to visually inform the Player that the information relating to the identification card has been validated, and a second lighting mode to visually inform the Player that the information relating to the identification card has not been validated. Preferably, the illumination device is provided by a multicolor light emitting diode so that in the first lighting mode, the light emitting diode illuminates in one color, and in the second lighting mode, the light emitting diode illuminates in another color.

Preferably, each key of the keypad is translucent for back lighting thereof, wherein the multicolor light emitting diodes provide back lighting to each key. Thus, upon validation or invalidation, the keys will be illuminated to inform the Player of the status of the information relating to the identification card before they begin keying in additional input data.

In another configuration, the validation device includes a microcontroller to control the animation of each light emitting diode in the first lighting mode and the second lighting mode. The microcontroller further includes an attract mode which operates each light emitting diode in an attract sequence when no identification card is positioned in the card reader opening. For example, when there is no identification card inserted in the card reader, the translucent keys may flash randomly or in patterns, as well as in different colors, to attract new Players.

In another aspect of the present invention, a player tracking system is provided for tracking Players of a plurality of gaming machines interconnected to a host computer which includes a player tracking device adapted to monitor the game play of a Player, and a card reader for reading a player identification card inserted in a card reader opening of the card reader. The system further includes a keypad mechanism having a plurality of keys to input data for use in the player tracking device, and an illumination device coupled thereto. In accordance with the present invention, a validation device is provided to determine the validation of information relating to the identification card inserted in the card reader opening. When the information is validated, the illumination device is illuminated at the keypad mechanism to visually inform the Player of such validation.

In still another aspect of the present invention, a method of validating information relating to a player identification card inserted into a card reader is provided including receiving the identification card in a card reader opening of the card reader; and providing a keypad mechanism having a plurality of keys for the input of data. The method further includes validating information relating to the identification card upon insertion of the card into the card reader opening for reading thereof; and illuminating an illumination device on the keypad mechanism to visually inform the Player that the information relating to identification card has been validated.

The validating information preferably includes illuminating the illumination device in a first lighting mode, to visually inform the Player that the information relating to the identification card has been validated, and illuminating the illumination device in a second lighting mode, to visually inform the Player that the information relating to the identification card has not been validated. The validating information may further include sensing the proper insertion of the identification card in the card reader opening for reading thereof.

In another embodiment, the validating information includes reading an identification code encoded on the identification card, and comparing the identification code to a predetermined code to determine the validation.

Yet another aspect of the present invention includes a method of validating information relating to a player identification card inserted into a card reader of one of a plurality of gaming device interconnected to a host computer. The method includes receiving the identification card in a card reader opening of a card reader of one of the gaming devices, and validating information relating to the identification card upon insertion of the card into the card reader opening for reading thereof. The method further includes illuminating an illumination device on a keypad mechanism, having a plurality of keys for the input of player tracking data, to visually inform the Player that the information relating to identification card has been validated.

In one embodiment, the method further includes, after validating the information, enabling the Player to input player tracking data through the keys of the keypad mechanism. The method may further include, after the validating the information, tracking the Player's game play on the gaming device.

BRIEF DESCRIPTION OF THE DRAWINGS

The method and assembly of the present invention has other objects and features of advantage which will be more readily apparent from the following description of the Best Mode of Carrying Out the Invention and the appended claims, when taken in conjunction with the accompanying drawing, in which:

BEST MODE OF CARRYING OUT THE INVENTION

Figure 1:
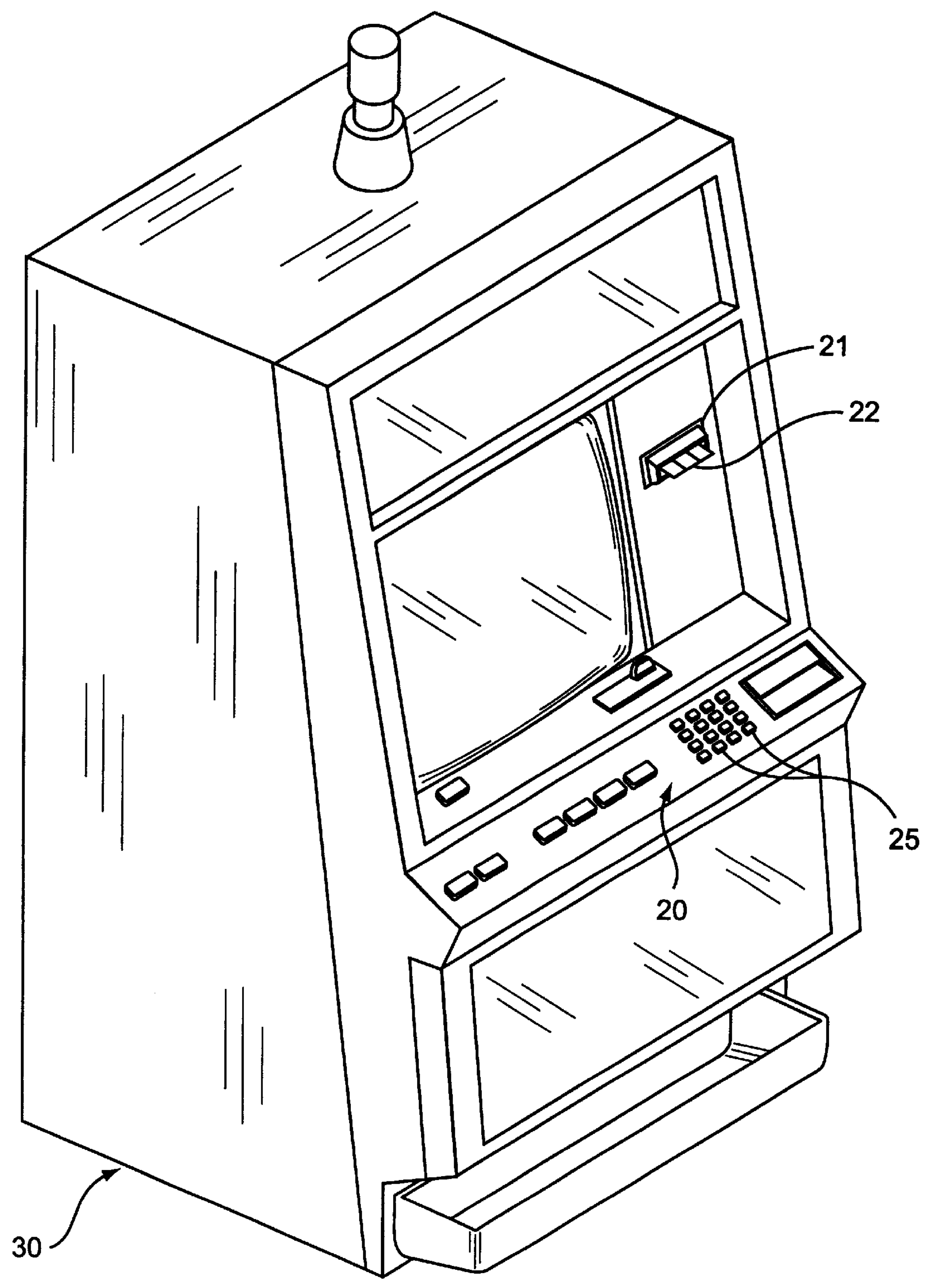
FIG. 1 is a top perspective view of a conventional gaming machine incorporating a keypad assembly constructed in accordance with the present invention.

While the present invention will be described with reference to a few specific embodiments, the description is illustrative of the invention and is not to be construed as limiting the invention. Various modifications to the present invention can be made to the preferred embodiments by those skilled in the art without departing from the true spirit and scope of the invention as defined by the appended claims. It will be noted here that for a better understanding, like components are designated by like reference numerals throughout the various figures.

Attention is now directed to FIGS. 1–4, 6 and 9 where a keypad assembly, generally designated 20, in accordance with the present invention is illustrated for use with a card reader 21 configured to read a player identification card 22 (FIG. 9) therein. The keypad assembly 20 includes a keypad mechanism 23 having a plurality of key components 25 to input data, and a feedback mechanism 26 (FIG. 6) coupled to the keypad mechanism 23. A validation device, generally designated 27, is provided which is adapted to determine the validation of information relating to the identification card 22 upon cooperation thereof with the card reader 21. The validation device 27 is operably coupled to the feedback mechanism 26 to visually inform the Player that the information relating to the Player's identification has been validated or invalidated.

Accordingly, the keypad mechanism itself is employed as a means to visually inform the Player about particular information relating to the Player's identification. The identification indicia, for example, include the input of a Personal Identification Number (PIN), a key, a SMARTCARD, an electronic button, a finger print imaging device, a retinal scan, combinations of any of these, combinations of a credit or debit card and any of the foregoing, etc. Moreover, the information relating to the Player's identification may include information relating to the Player's identification card such as the manual input of the PIN or a proper identification card insertion and read of the card in the card reader.

Once the player inserts their personal identification card into the card reader, or the Player inputs their PIN into the keypad mechanism, for example, the Player is visually informed of the validation or invalidation of such particular information through the illumination or non-illumination of the keypad assembly. This enables the Player to direct their attention immediately to the keypad mechanism to visually determine the validation of the particular information relating to the identification card. Unlike the current information validation systems, this is advantageous in that the key-in or acquisition of additional data may commence more quickly once verification occurs since the Player's attention is already directed toward the keypad.

The present invention is particularly suitable for use with a player tracking system 28 which, in the gaming industry, is typically employed for tracking Players of a plurality of gaming machines 30. Briefly, as shown in the schematic diagram of FIG. 3, each gaming machine 30 is electrically interfaced to a central player tracking or host system computer 32 through a respective a player tracking module 31. The player tracking system 28 further includes card reader 21, keypad assembly 20 and a display device 33 which collectively allow the Player to interface with the system computer 32. Once the Player's identification is verified, preferably via an issued player identification card 22 which itself incorporates a unique personal identification code, the keypad assembly 20 of the present invention will allow the player tracking module 31 to obtain information from the Player through key component presses and to assess the validation of the particular information through the visualization of the backlit key components 25.

Briefly, it will be understood that the details of the circuitry and electronics of the present invention, such as the microcontrollers, the application software, and the like, may be resident in any one of the keypad mechanism 23, the host system computer 32, the gaming machine itself, or a combination thereof.

However, for clarity and the easy of description, the present invention is primarily described in reference to the embodiment having the majority of the componentry resident in the keypad assembly. Most of this componentry, however, may adaptable for application with the system computer or the gaming machine with minimal design change.

Figure 3:
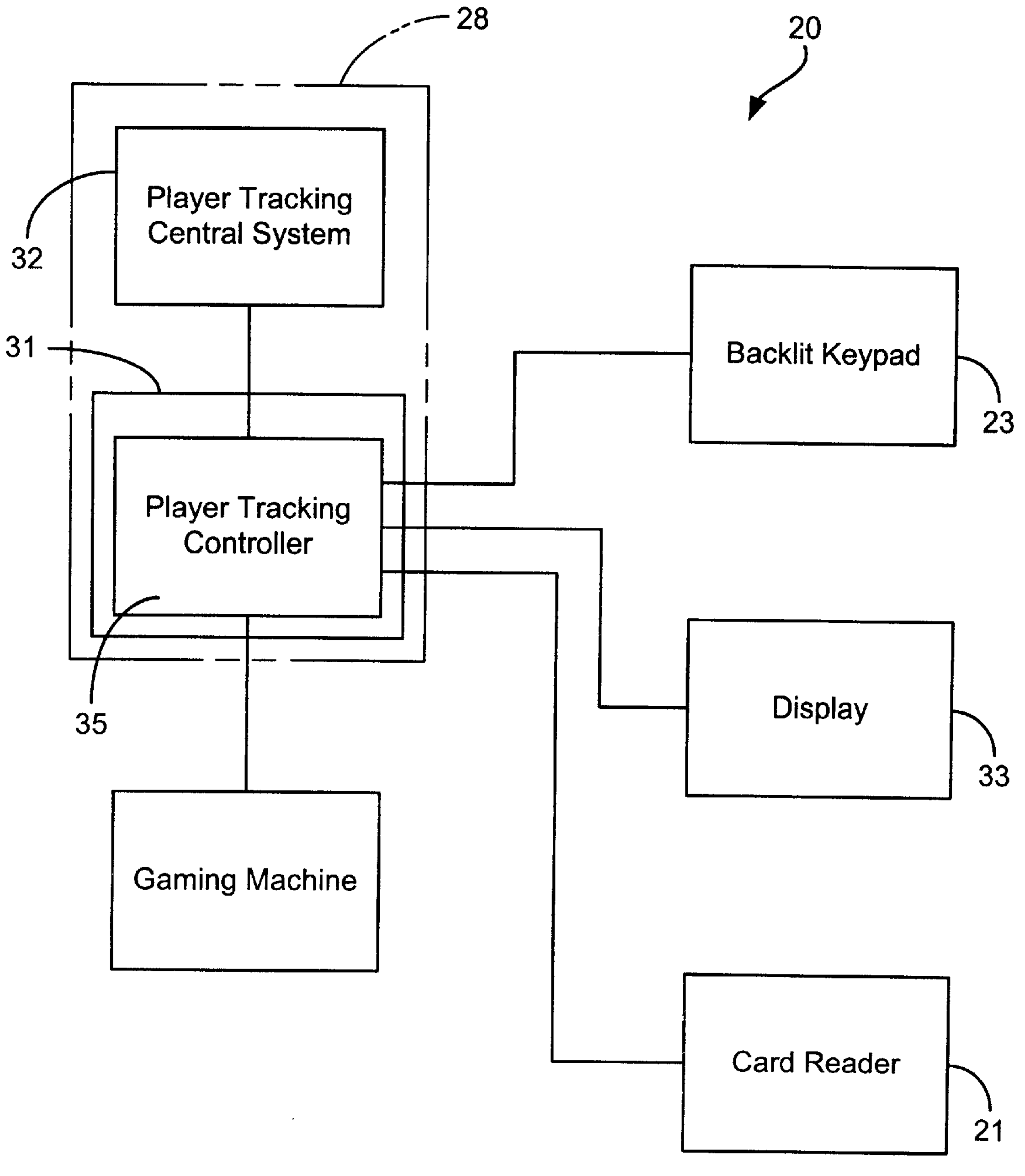
FIG. 3 is a schematic representation of a player tracking system for a gaming machine which incorporates the keypad assembly of the present invention.
Figure 4:
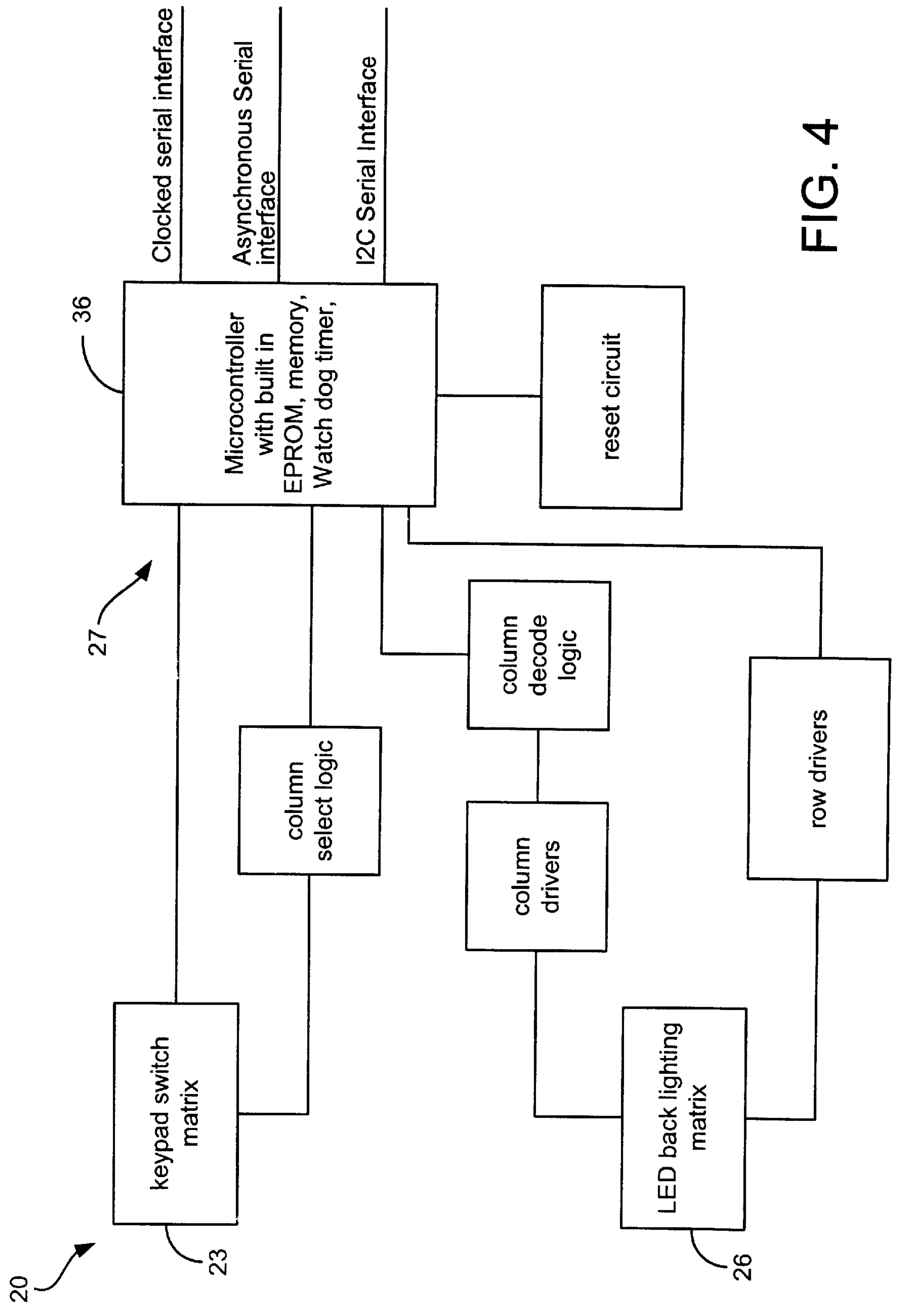
FIG. 4 is a schematic representation of the keypad assembly of the present invention.

FIG. 3 illustrates that the player tracking module 31 further includes a player tracking controller unit 35 which generally performs the functions of communicating with the gaming machine, communicating with the system, verifying the card was read correctly, writing data to display. Operably coupled to this unit 35 is the keypad assembly 20 of the present invention which enables the Player to interface with the other components of the player tracking system 28 such as the card reader 21 and the host system computer 32. The keypad assembly 20 includes an onboard microcontroller 36 which provides all scanning and decoding functions of the keypad component matrix, as well as control of the visual feedback of the individual keys. This microcontroller 36 further operates to interface the player tracking controller unit 35 with the keypad mechanism 23 through a clocked serial interface (FIGS. 3 and 4). Thus, the keypad assembly 20 of the present invention is adaptable to interface with existing player tracking controller units through clocked serial connections, or with new versions of the player tracking controller units through ASYNC serial communications and $I^2C$ serial communications.

Referring back to FIG. 2, the keypad mechanism 23 preferably includes sixteen (16) key components aligned in a 4×4 matrix. It will be appreciated, of course, that a larger or smaller matrix may be employed. Preferably, keypad includes ten (10) conventional number key components 25', a "cocktail" key component 25" and an "attendant" key component 25'". Four (4) programmable "function" key components 25"" may be included for optional functions and features such as the inquiry of information relating jackpot bonus games, player tracking information or the like.

Figure 5:
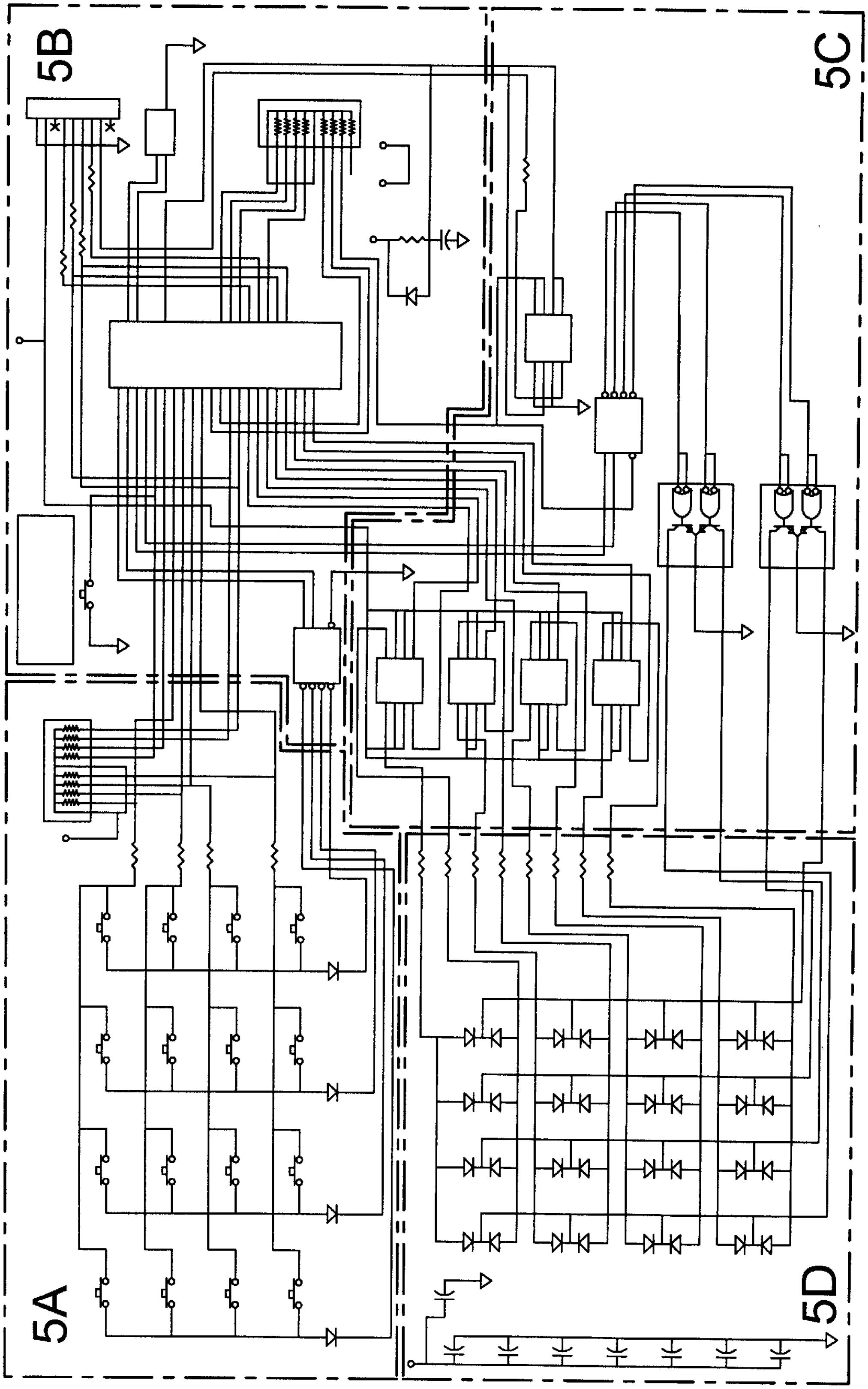
FIG. 5 is a schematic diagram of the keypad assembly of the present invention.
Figure 5A:
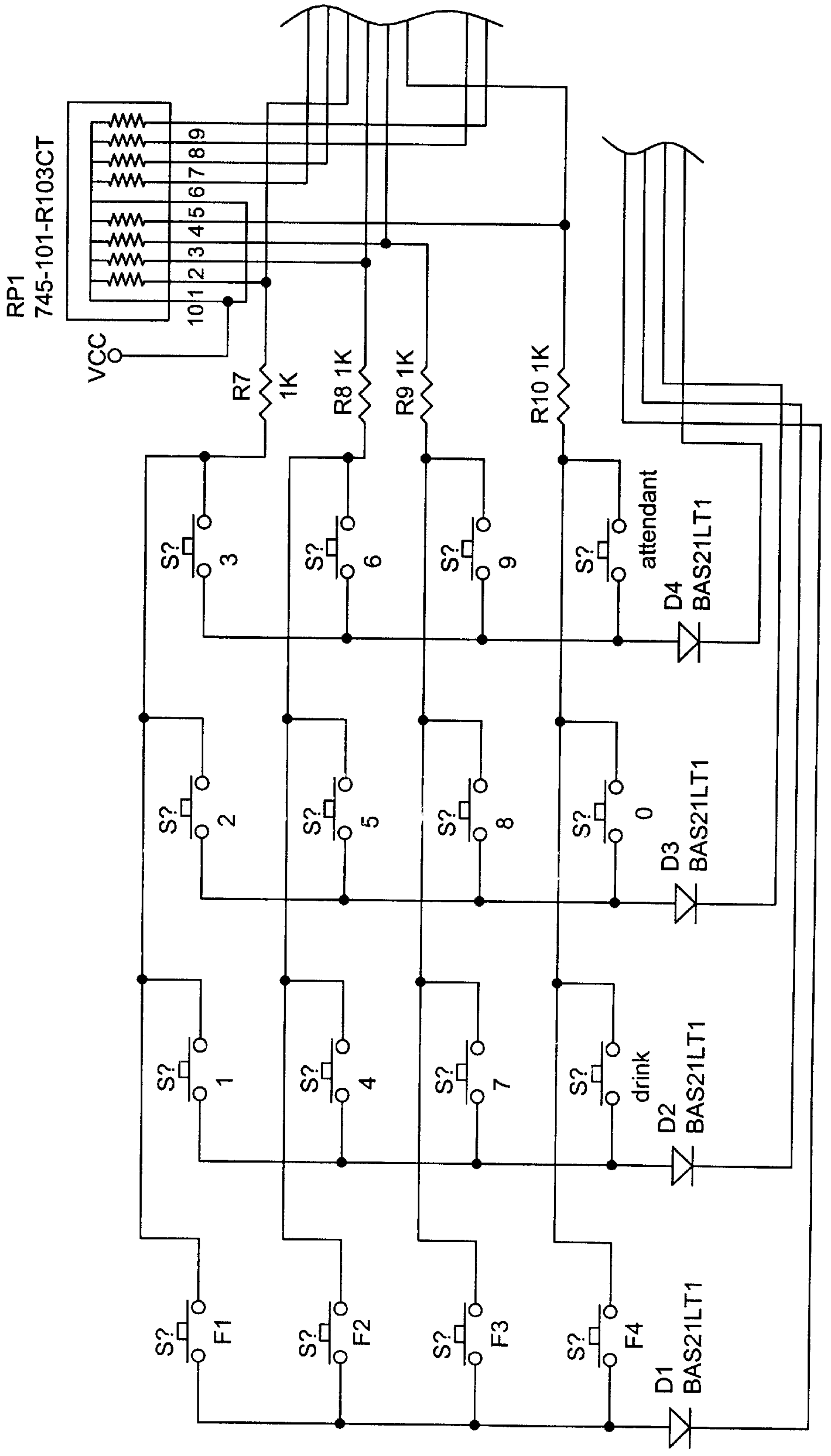
Figure 5B:
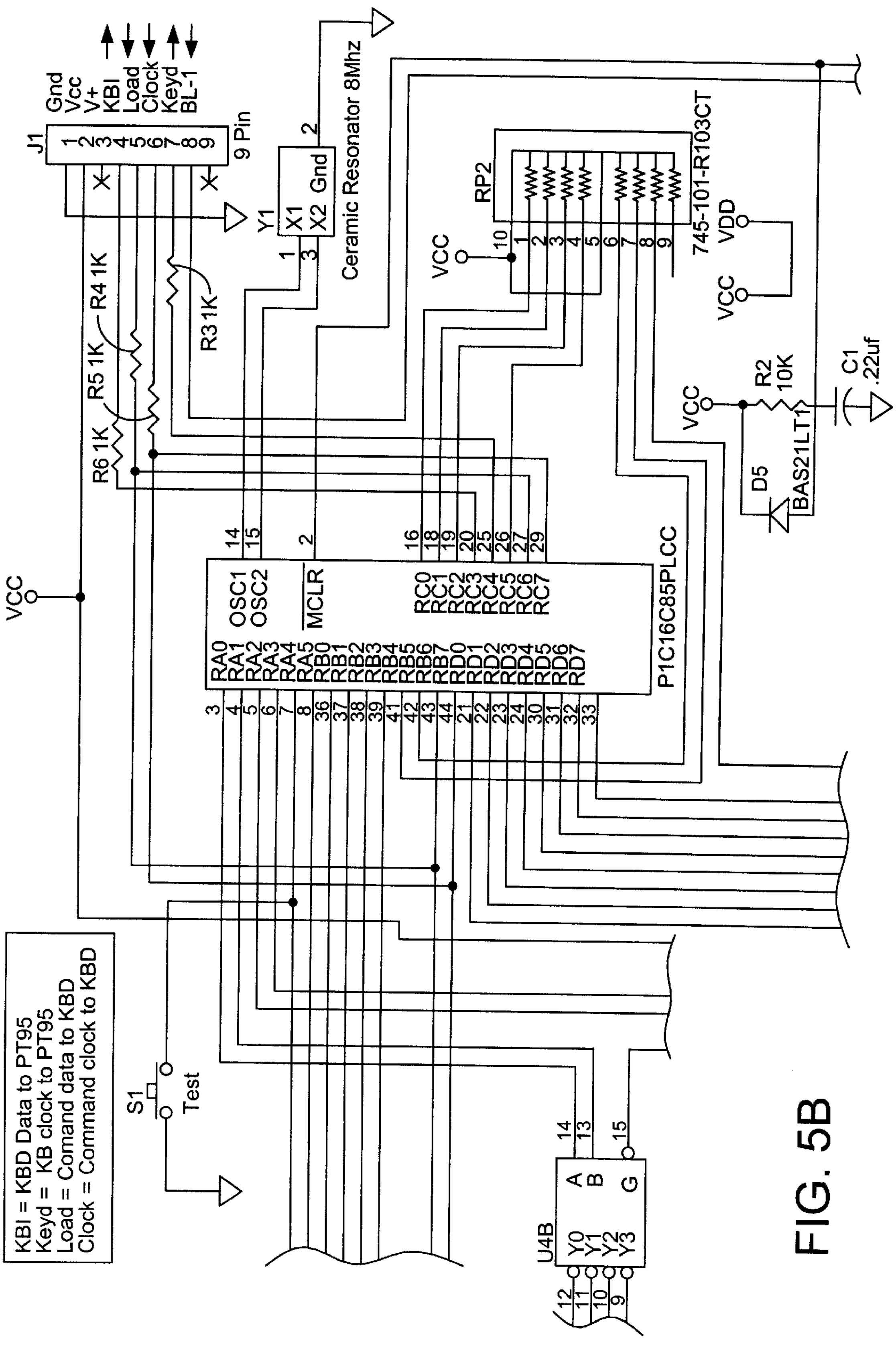
Figure 5C:
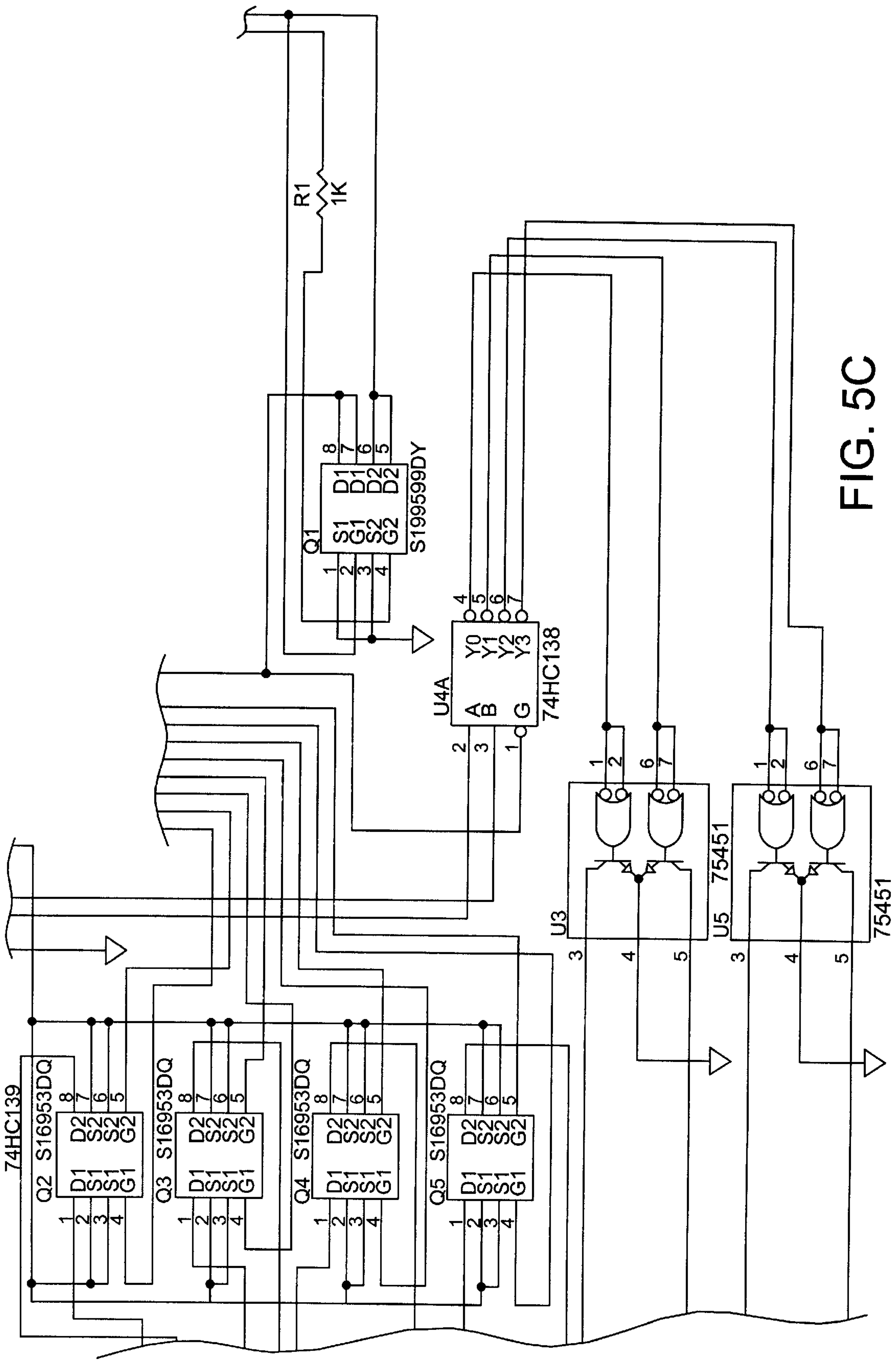
Figure 5D:
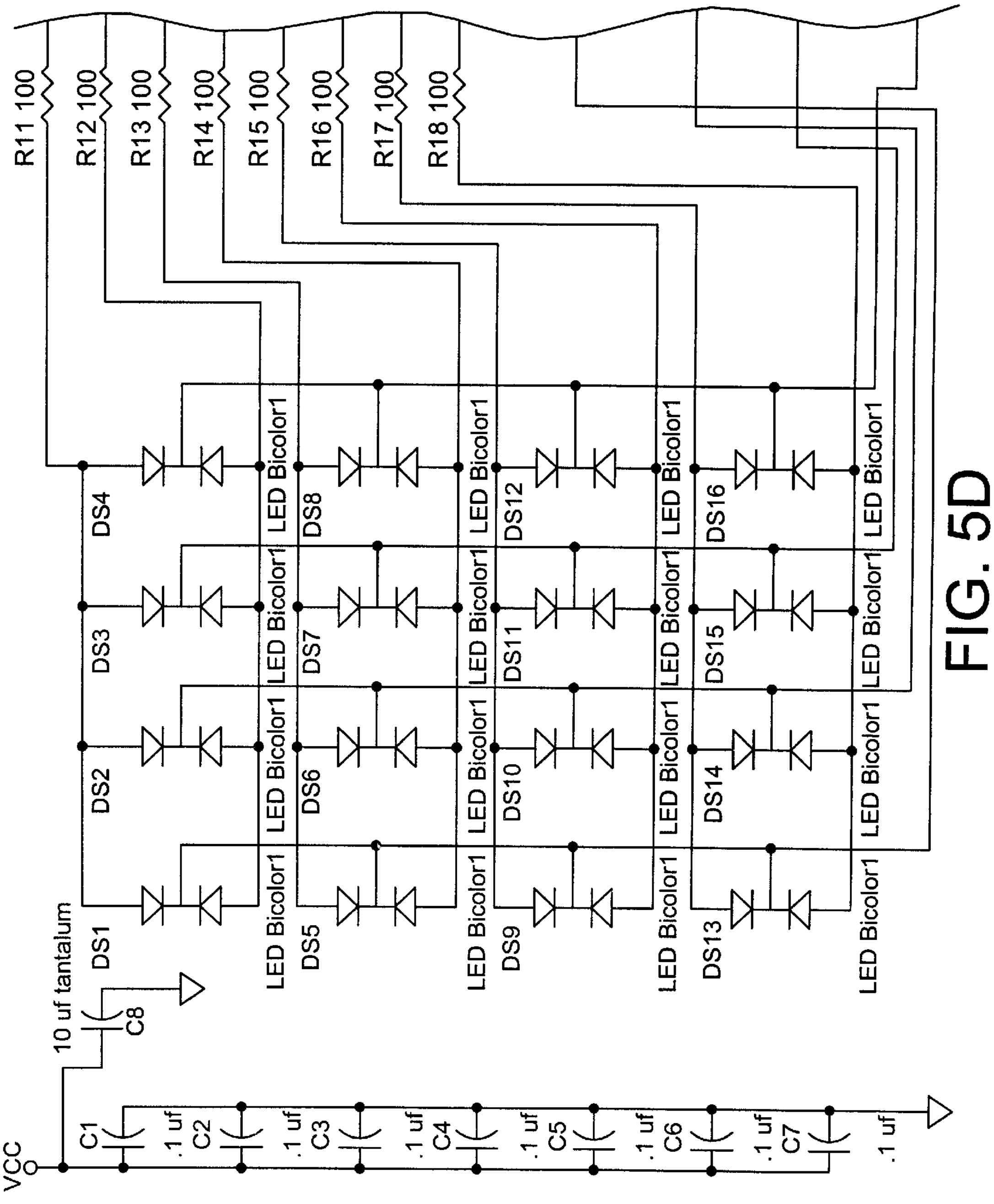

During conventional data input use, the key components 25 may be configured to illuminate and/or flash when pressed and/or not pressed, such as when the Player's Personal Identification Number (PIN) is being keyed-in through the keypad mechanism 23. Briefly, and as shown in an exemplary schematic diagram of the keypad mechanism 23 in FIG. 5, the columns of the keypad matrix are scanned by embedded software and the row inputs are read in and decoded. Column selection is performed by the use of two bits from port RA (RA0 and RA1). These output ports are connected to one half of a 74HC139 2-to-4 decoder. As a binary pattern is presented to the input of the 74HC139, one of the 4 outputs is driven low. This is the select for a column. As viewed in the schematic diagram, port RB0–RB3 are all tied to $V_{CC}$ with a 10K resistor to assert a logic true condition until a key component 25 is pressed. When a particular key component 25 is pressed, the corresponding row is sinked to ground which causes a zero (0) to be read on the corresponding pin of port RB(RB0–RB3). Each of the column sinks is isolated with a diode, allowing any two key components 25 to be depressed simultaneously with full identification by the microcontroller 36. Should any more than two key components be depressed simultaneously, an invalid input will be yielded and should be rejected as invalid input.

The illumination devices 26, preferably Light Emitting Diodes (LED), are driven through a similar column select as that of the keypad components. As viewed in FIG. 5, two bits of RA are used to control the other half of the 74HC 139 decoder (RA2 and RA3). The output of the decoder is connected to a current sink. During reset conditions, the 74HC139 decoder is disabled to guarantee that a column of LEDs is not selected when the processor is not active. Port D (RD0–RD7) is used to drive the column source drivers for the LEDs, which therefore requires the LEDs to be multiplexed. The outputs of RD are connected to the red and green LED drive signals as follows:

| | |
|---|---|
| RD0= | Row 0 red |
| RD1= | Row 0 green |
| RD2= | Row 1 red |
| RD3= | Row 1 green |
| RD4= | Row 2 red |
| RD5= | Row 2 green |
| RD6= | Row 3 red |
| RD7= | Row 3 green |

To provide the desired visual feedback function, each key component 25 is backlit by a respective illumination device 26 which is operably connected to the microcontroller 36 of the validation device 27 for on/off operation thereof.

Figure 6:
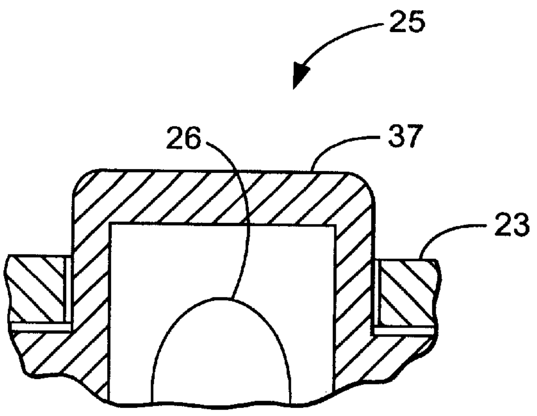
FIG. 6 is a fragmentary, enlarged side elevation view, in cross-section, of a key component of the keypad mechanism taken substantially along the plane of the line 6—6 in FIG. 2.
Figure 2:
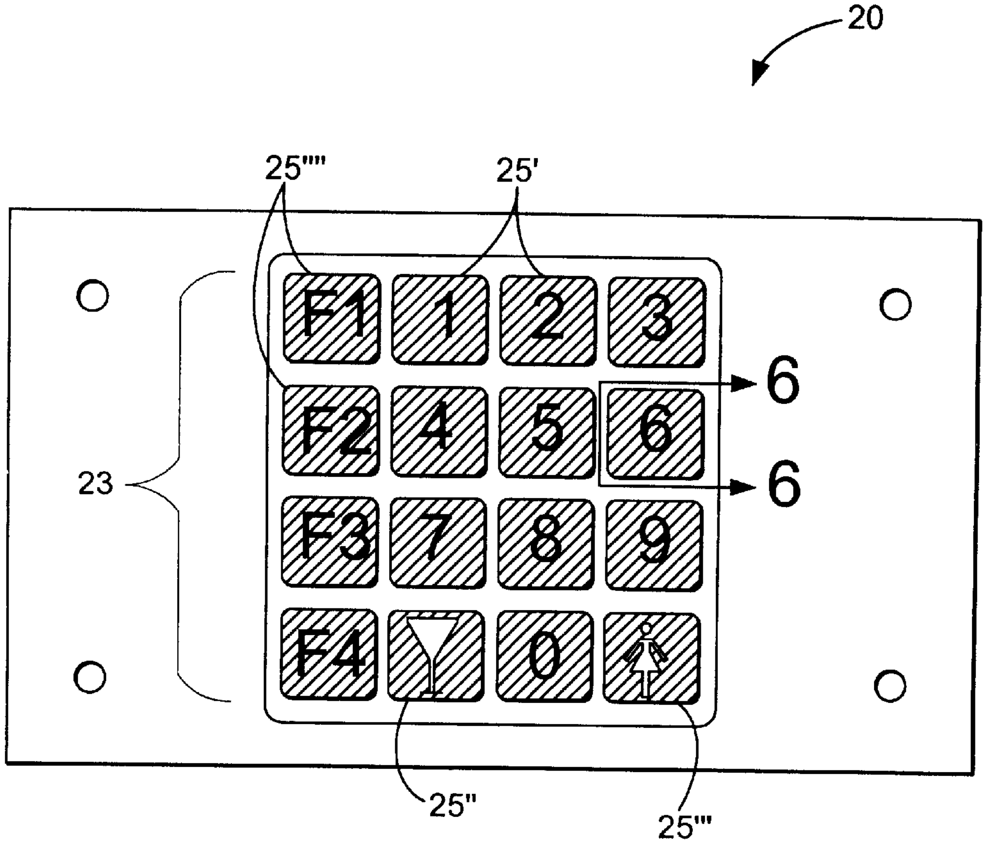
FIG. 2 is an enlarged top plan view of a keypad mechanism of the keypad assembly of FIG. 1.

As best viewed in the cross-section of FIG. 6, each key component 25 preferably includes a flexible translucent or transparent cover 37, such as silicone rubber or the like, which is formed to house the illumination device 26 therein. Upon illumination, the light generated by the illumination device 26 radiates out of the top of the cylindrical column 38 and through the translucent cover 37 to provide the backlit visual illumination.

In the preferred embodiment, each illumination device 26 is provided by a conventional Light Emitting Diode (LED). Advantageously, these LEDs reduce power consumption and generate substantially less heat than incandescent lights. More preferably, these LEDs are tri-color-type LEDs capable of illumination in red, green or yellow. Other colors may be employed, however. In this manner, at least one or a plurality of key components 25 can be illuminated in a first lighting mode to visually inform the Player that the information relating to the identification card has been validated, while in the event of an invalidation of the information, the validation device includes a second lighting mode to visually inform the Player that the information relating to the identification card has not been validated. For instance, upon validation of the particular information, one or a plurality of the backlit key components 25 may be illuminated in the color "green" to indicate a "valid" key-in of the Personal Identification Number (PIN) in the keypad mechanism 23. In contrast, in the second lighting mode, the backlit keys may be illuminated in the color "red" to indicate an invalid input of the required information thereof.

Figure 8:
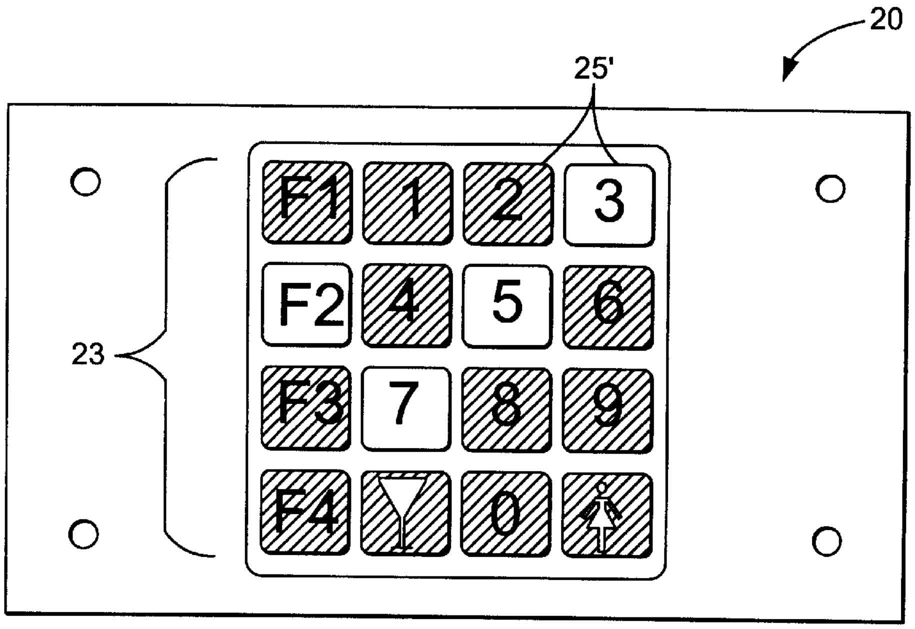
FIG. 8 is a top plan view of the keypad mechanism of FIG. 2 illustrating an illumination pattern in the form of a "X" symbol representing an invalidation of information.
Figure 7:
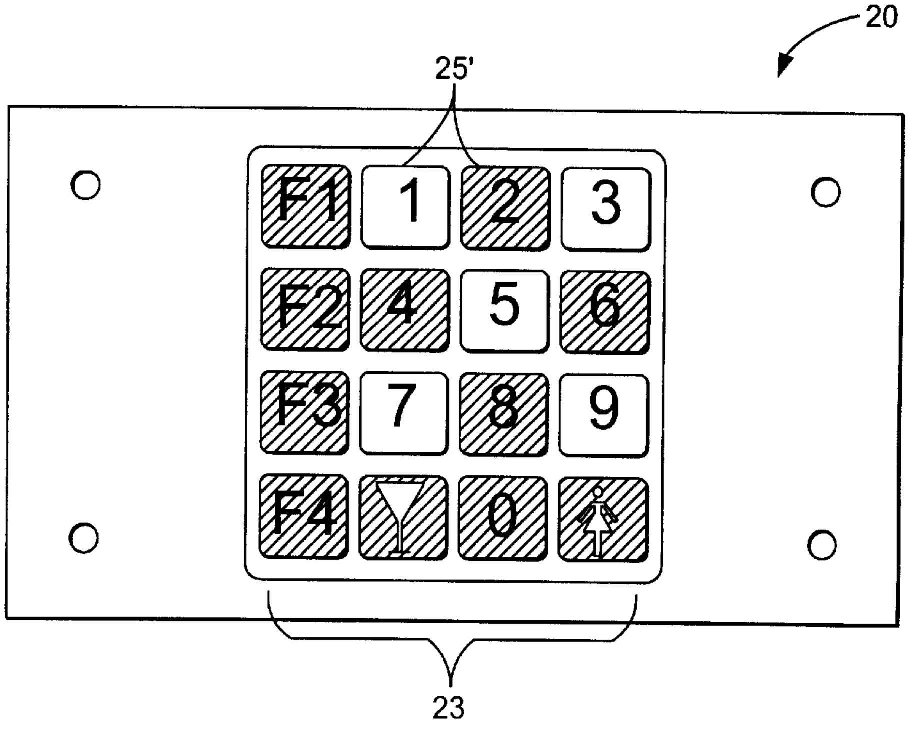
FIG. 7 is a top plan view of the keypad mechanism of FIG. 2 illustrating an illumination pattern in the form of a "√" symbol representing a validation of information.

Moreover, since each multi-color LED is individually addressable, the 4×4 matrix may be illuminated in predetermined patterns, as well as multiple color schemes. For example, upon validation of the particular information such as proper identification card insertion, the validation device may illuminate the keypad matrix in a first illumination pattern (i.e., the first lighting mode). Such a pattern, as shown in FIG. 7, may be in the form of an "√" symbol in the color green by illuminating the "F2,", "3", "5" and "7" key components 25, while in the event of invalidation of the information, a second illumination pattern (i.e., the second lighting mode) in the form of an "X" symbol in the color red may be illustrated (FIG. 8) by illuminating the "1", "3", "5", "7" and "9" key components 25 . It will be understood, of course, that other symbols as well as other color schemes may be employed without departing from the true spirit and nature of the present invention.

In accordance with another aspect of the present invention, the keypad assembly 20 may include an attract sequence which animates the keypad components 25 when the keypad assembly 20 is not in use. For example, using a set of animation tables residing in code ROM, the individually addressable LEDs can be flashed in a patterned or colored sequence to attract Players to the gaming machine 30. Such an attract sequence may be automatically activated during non-use of the keypad or when the card reader is in non-use. Upon detection of use of a key component closure or insertion of an identification card, the microcontroller 36 can abort the attract sequence. Additionally, more than one animation mode may be included depending upon the circumstance, such as during bonus play.

Figure 9:
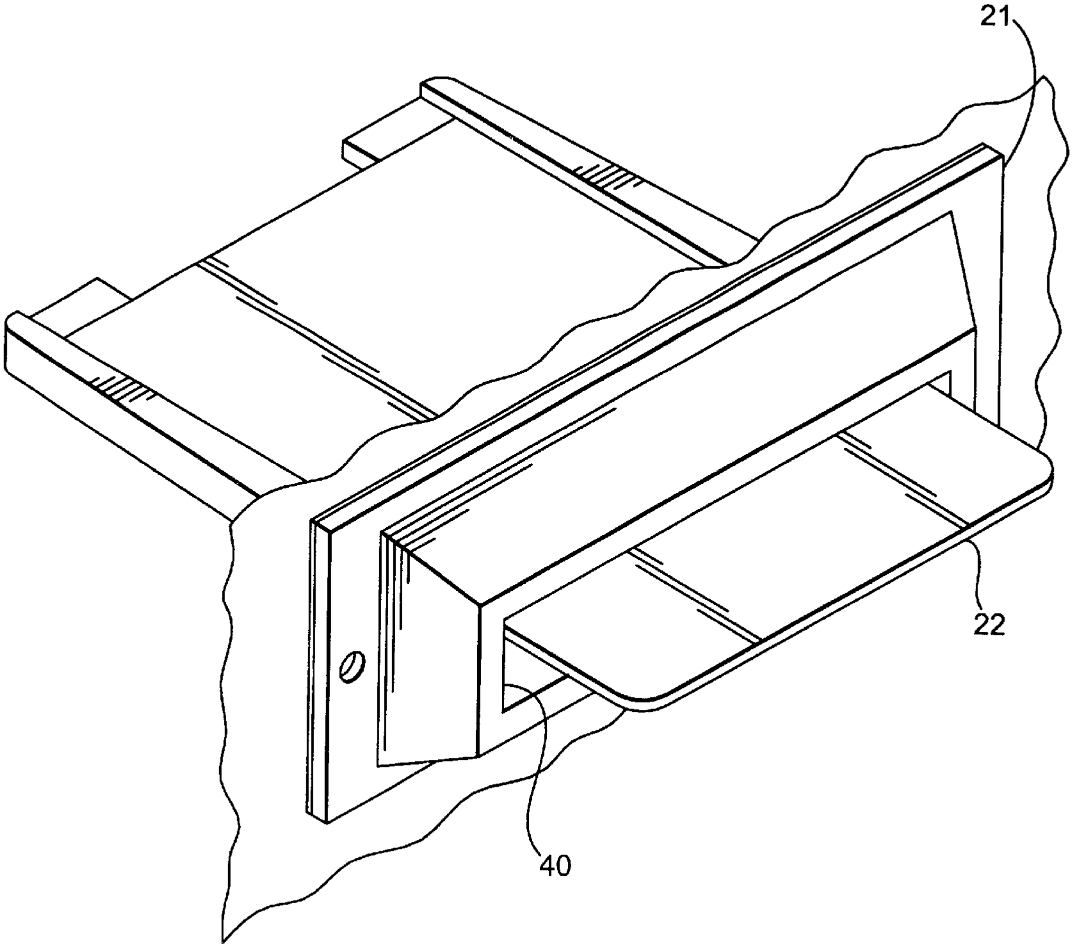
FIG. 9 is an enlarged top perspective view of a conventional card reader device employed with the keypad assembly of the present invention.

Referring now to FIG. 9, the card reader 21 is illustrated with the identification card 22 inserted in a card reader opening 40 thereof. In accordance with the present invention, any conventional card reader device may be utilized which is adapted to read/write cards having magnetic strips, bar codes, etc. Moreover, other state of the art identification devices may be used, such as SMARTCARD technology, which generally describe cards having a computer processor for use in a secure payment system and are employed for player tracking and/or cashless gaming use. Typically, these cards include a stored or embedded card identification number which identifies the origin of the particular card read by the card reader. As an example, and for security purposes, especially with smart and debit card applications, the input of a PIN code may be necessary, similar to an ATM card, before use or commencement of the player tracking system. In this configuration, thus, the Player may be required to input or key-in a four to six digit identification code through the keypad mechanism for validation. Once the keyed-in PIN code is input, the microcontroller 36 or the tracking system host computer 32 compares this input code with the Player's PIN code stored in the host computer for validation thereof. Upon validation, the keypad assembly 20 of the present invention would immediately visually inform the Player of such validation by illuminating one or more of the key components 25.

In another example, these tracking systems often incorporate an identification code specific to the institution of issuance. Thus, in the same manner, should the identification code read from the identification card 22 fail to correspond to the institution identification code, then the keypad would indicate an invalid illumination.

In still another example, the validation device 27 of the present invention may further include a sensor device or the like which cooperates with the card reader to determine whether the identification card 22 has been properly inserted into the card opening 40 of the card reader. Should the sensor indicate that the identification card 22 has been properly seated in the card reader 21 for a proper card "read", the keypad mechanism will be illuminated in a "valid" mode of operation.

Incorporated in the keypad assembly 20 is software which performs the following functions for the keypad mechanism 23. These functions include receive commands from and send key press information to the player tracking controller unit 35. Moreover, the keypad software further functions to acknowledge receipt of commands from the player tracking controller, decode and debounce key switch activation, and process commands received from the player tracking controller unit 35.

The control of all back lighting of keypad mechanism 23, as executed by the microcontroller 36, is further operated by the keypad software. Briefly, each key component 25 can be lit when released and/or lit when pressed, and/or each key can be flashing when released and/or flashing when pressed. The keypad software further includes a set of built-in attract sequences which animate the key colors when the keypad is not in use. Attract sequences can be selected using the command language.

More specifically, in accordance with the attributes and subroutines, an attribute table resides in on-chip RAM which comprises 16 attribute bytes, each of which includes a 16-byte array residing in on-chip RAM which comprises 16 attribute bytes, each of which corresponds to one key component 25. The respective attribute byte for a key component determines whether the LED is illuminated when pressed, not illuminated when not pressed, the color of illumination if lit, and whether the respective LED is flashed when pressed and/or not pressed.

At a command interface, the commands are received from the host computer 32 via a clocked serial interface. Preferably, this is at rate of 9600 baud, but may vary in accordance with the state of the field. These commands include a define keypad attributes command, an attract mode command and a stop attract mode command. Each command is composed of an address (wakeup bit set) byte; a command code byte; a length of command byte, including address, command code, length byte, all data and both CRC bytes; an optional data byte; a CRC low byte; and a CRC high byte. Furthermore, each byte of a command consists of a start bit, 8 data bits, a $9^{th}$ bit called the wakeup bit, and a stop bit.

In a Keypad Status Reporting routine, whenever a key component 25 is pressed, an ASCII code corresponding to the key component is sent to the host system computer 32. If a command is being received from the host computer system when the key component is pressed, the ASCII code is not sent until command reception is completed. The keypad status reporting is handled by a main loop code, to be discussed below. A single-byte buffer will contain a key code if the interrupt service routine has detected a key closure. Another subroutine NEWK determines if the key closure is that of a new key component. In the event that the key closure is a new key, a subroutine ASCTRANS is called to send the ASCII code to the host system computer 32. The single-byte buffer is then set to zero to indicate that it is ready to handle another key component.

During an initialization routine after a power-up, a subroutine INIT_PIC commences to perform three initialization functions. These functions include the programming and initialization of the I/O ports, and the programming of a timer 0 to overflow every 10 milliseconds. Finally, the attribute table is initialized with default keypad attributes such as: off when the key component is not pressed; and a solid yellow illumination of the LEDs when a corresponding key component is pressed.

After initialization is complete, the main loop code accesses two subroutines. A CK_BUFFER subroutine checks if a new key component has been pressed. A SENDKEY subroutine is then accessed to send the ASCII code to the host system computer. Secondly, a CK_COMMAND subroutine checks for a start bit from the host computer system. Should the start bit be detected, this subroutine subsequently receives a byte from the host computer system. If the byte received is the last byte of a command, the CK_COMMAND subroutine interprets and executes the command.

Timer 0 is configured to continuously interrupt the microcontroller 36 at 10 ms intervals. During each interrupt, the keypad mechanism 23 is scanned, and any backlighting is commenced or refreshed. Further tasks are preferably performed at this time include flash timing, and an attract mode animation, which are discussed henceforth.

During keypad scanning, each column of the keypad mechanism 23 is scanned at 10 millisecond intervals by the Timer 0 interrupt service routine. A variable contains the column number currently being scanned, and is incremented at each timer 0 interrupt. The column number is used to enable a key column via the microcontroller output Port A. Key closures are then detected by reading the microcontroller input port B. When a key component 25 closure is detected, its code is stored in the single-byte key buffer, but only if the single-byte key buffer is 0. In the event the single-byte key buffer already contains a key code, this code will not overwritten. The main loop code will translate the key code into an ASCII code and send it to the host system computer 32. As previously described, single-byte key buffer is then set to zero which indicates to the interrupt service routine that another key code can be sent.

Immediately after the keypad scan, backlighting of the corresponding keypad LEDs commences in the key column being scanned. The keypad attributes are fetched from the attribute array and the LEDs are programmed with the appropriate color depending on whether a key component is pressed or not. If the key attribute indicates flashing, and the flasher bit is "OFF", the corresponding LED is turned off.

As above-indicated, flash timing of the keypad assembly commences during each interrupt interval. A subroutine BLINK is accessed which complements all the flasher bits in the keypad attribute table. This is preferably performed about every $116^{th}$ interval, which yields a flash interval of about 1.2 seconds. Another predetermined number of intervals may be employed of course.

In an attract mode, the key component LEDs are animated using a set of animation tables which reside in code ROM. Each frame of the animation sequence consists of four (4) bytes. Each byte contains the 2-bit color code for four (4) key lights. The frames are preferably advanced every thirty-two (32) Timer 0 interrupt periods for an animation speed of 320 ms per frame.

As indicated, preferably three (3) animation modes are supported, which includes "snake", "swipe", and "fire" effects. For example, a "snake" effect would emulate a snake moving around the keypad, while a "swipe" effect would appear as a color change sweeping across the entire keypad. Finally, the "fire" effects would employ the colors of the LED to emulate fire.

The animation mode determines which of three animation tables are used. A subroutine ANIMATE is preferably called every twenty-one (21) timer 0 interrupt periods to advance the frame. The ANIMATE subroutine retrieves the next frame from the animation table and employs this data to override the keypad attributes. Upon detection of a key component closure, the attract mode is aborted.

In accordance with another aspect of the present invention, a method of validating information relating to a Player's identification for a gaming device is provided including the steps of receiving an identification card 22 in a card reader opening 40 of the card reader 21, and providing a keypad assembly having a plurality of key components for the input of data. The next step includes validating information relating to the identification card 22 upon insertion of the card into the card reader opening for reading thereof; and illuminating an illumination device 26 on the keypad mechanism 23 to visually inform the Player that the information relating to identification card has been validated.

Upon validation of the information, the method of the present invention includes illuminating the illumination device 26 in a first lighting mode to visually inform the Player that the information relating to the identification card has been validated. In the event the information relating to the identification card has not been validated, the method includes illuminating the illumination device 26 in a second lighting mode to visually inform the Player of the invalidation. The first lighting mode, for example, may include illuminating the multi-color LEDs in one color in the first lighting mode, and illuminating the multi-color LEDs in another color in the second first lighting mode.

The method of the present invention may further includes the step of illuminating the illumination device 26 in a third lighting or attract mode when no identification card 22 is positioned in the card reader opening 40. Further, the validating information includes the step of reading a unique identification code encoded on the identification card, and comparing the identification code to a predetermined code to determine the validation.

Although the foregoing invention has been described in some detail for purposes of clarity of understanding, it will be apparent that certain changes and modifications may be practiced within the scope of the appended claims. For instance, although the specification has described a keypad assembly and card reader on gaming machines, such interface may be used on other casino stations as well. For example, a pad assembly of the type described above may also be used with blackjack or craps tables. Further, the systems of this invention are not limited to conventional casino gaming machines and stations, but may include other machines such as amusement machines, televisions, vending machines, etc. In addition, the reader will understand that the terminals as describe herein can be with gaming machines that are not necessarily located in a casino or connected to a LAN. Thus, in some embodiments, the gaming machines incorporating the keypad assembly of this invention may be stand-alone machines located in bars, drug stores, or other establishments.

What is claimed is:

1. A keypad assembly for use with a card reader configured to read a player identification card therein, said keypad assembly comprising:

a keypad mechanism having a plurality of keys to input data, said keys being translucent for back lighting thereof;

a card reader feedback mechanism coupled to the keypad mechanism, said feedback mechanism including a plurality of illumination devices for selective illumination a respective key thereof; and a validation device coupled to the feedback mechanism, and adapted to determine the validation of information relating to the identification card upon cooperation thereof with the card reader, said validation device further being operably, coupled to the illumination devices for collective illumination of the keys in a first lighting mode to visually inform the Player that the information relating to the identification card has been validated, and a second lighting mode to visually inform the Player that the information relating to the identification card has not been validated.

2. The keypad assembly as defined in claim 1, wherein each said illumination devices is provided by a Light Emitting Diode (LED).

3. The keypad assembly as defined in claim 2, wherein each said LED is a multi-color LED illuminating one color in the first lighting mode, and illuminating another color in the second lighting mode.

4. The keypad assembly as defined in claim 3, wherein, said validation device includes a microcontroller to control the animation of each light emitting diode in the first lighting mode and the second lighting mode.

5. The keypad assembly as defined in claim 4, wherein, said microcontroller further includes an attract mode which operates each light emitting diode in an attract sequence when no identification card is positioned in the card reader opening.

6. The keypad assembly as defined in claim 1, wherein said information relating to the identification card includes the validation of an identification code input through the key components by the Player.

7. The keypad assembly as defined in claim 6, wherein said keys of the keypad mechanisms are arranged in a matrix, said first lighting mode includes a first illumination pattern of illuminated keys of said matrix upon validation of the identification code, and said second lighting mode includes a second illumination pattern of illuminated keys of said matrix upon the invalidation of the identification code.

8. The keypad assembly as defined in claim 7, wherein said first illumination pattern is in the form of an "√" symbol, and said second illumination pattern is in the form of a "X" symbol.

9. The keypad assembly as defined in claim 1, wherein said information relating to the identification card includes the proper insertion into a card reader opening of the card reader for reading thereof.

10. The keypad assembly as defined in claim 9, wherein, said validation device includes a sensing device cooperating with the card reader to detect the proper insertion of the identification card in said card reader opening.

11. The keypad assembly as defined in claim 1, wherein said information relating to the identification card includes gaming establishment code information to verify use at selected establishments.

12. A player tracking system for tracking Players of a plurality of gaming machines interconnected to a host computer comprising:

a player tracking device adapted to monitor the game play of a Player;

a card reader for reading a player identification card inserted in a card reader opening of the card reader;

a keypad mechanism having a plurality of keys to input data for use in the player tracking device, each of said keys being translucent for back lighting thereof;

a plurality of illumination devices each corresponding to a respective key;

a validation device coupled to the feedback mechanism, and adapted to determine the validation of information, said validation device further being operably coupled to the illumination devices for collective illumination of the keys in a first lighting mode to visually inform the Player that the information relating to the identification card has been validated, and a second lighting mode to visually inform the Player that the information relating to the identification card has not been validated.

13. The player tracking system as defined in claim 12, wherein each said illumination device is provided by a multi-color Light Emitting Diode (LED) illuminating one color in a first lighting mode to visually inform the Player that the information has been properly validated, and illuminating another color in a second lighting mode to visually inform the Player that the information has not been properly validated.

14. The player tracking system as defined in claim 13, wherein said validation device includes a sensing device cooperating with the card reader to detect the proper insertion of the identification card in said card reader opening.

15. The player tracking system as defined in claim 13, wherein, said validation device includes a microcontroller to control the animation of each LED in the first lighting mode and the second lighting mode.

16. The player tracking system as defined in claim 15, wherein, said microcontroller further includes an attract mode which operates each LED in an attract sequence during non-use of the card reader.

17. The player tracking system as defined in claim 12, wherein said information includes the validation of an identification code input through the keys by the Player.

18. The player tracking system as defined in claim 17, wherein said keys of the keypad mechanisms are arranged in a matrix, said first lighting mode includes a first illumination pattern of illuminated keys of said matrix upon validation of the identification code, and said second lighting mode includes a second illumination pattern of illuminated keys of said matrix upon the invalidation of the identification code.

19. The player tracking system as defined in claim 18, wherein said first illumination pattern is in the form of an "√" symbol, and said second illumination pattern is in the form of a "X" symbol.

20. A method of validating information relating to a player identification card inserted into a card reader of a gaming device comprising:

providing a keypad mechanism having a plurality of keys for the input of data, each of said keys being translucent for back lighting thereof;

validating information relating to the identification card upon insertion of the card into the card reader opening for reading thereof; and illuminating an illumination device to illuminate the at least one key to visually inform the Player that the information relating to identification card has been validated;

validating information relating to the identification card upon insertion of the card into the card reader opening for reading thereof; and collectively illuminating a plurality of illumination devices, each corresponding to a respective key, in a first lighting mode to visually inform the Player that the information relating to the identification card has been validated, and in a second lighting mode to visually inform the Player that the information relating to the identification card has not been validated.

21. The method as defined in claim 20, wherein said information relating to the identification card includes the proper insertion into a card reader opening of the card reader for reading thereof.

22. The method as defined in claim 21, wherein, the validating information includes sensing the proper insertion of the identification card in said card reader opening for reading thereof.

23. The method as defined in claim 20, further including:

tracking the Player's game play on the gaming device upon validation of the information.

24. The method as defined in claim 20, further including:

collectively back lighting each key in a third lighting mode when no identification card is positioned in the card reader opening.

25. The method as defined in claim 20, wherein, said validating information includes reading an identification code encoded on said identification card, and further including:

comparing said identification code to a predetermined code to determine the validation.

26. The method as defined in claim 20, wherein said illuminating includes illuminating a first illumination pattern of keys upon validation of the information relating to the identification card, and illuminating a second illumination pattern of keys upon invalidation of the information relating to the identification card.

27. A method of validating information relating to a player identification card inserted into a card reader of one of a plurality of gaming device interconnected to a host computer, the method comprising:

receiving the identification card in a card reader opening of a card reader of one of the gaming devices;

validating information relating to the identification card upon insertion of the card into the card reader opening for reading thereof; and collectively illuminating a plurality of illumination devices, each corresponding to a respective key of a keypad mechanism for the input of player tracking data and each said key being translucent for back lighting thereof by the respective illumination device, in a first lighting mode to visually inform the Player that the information relating to the identification card has been validated, and in a second lighting mode to visually inform the Player that the information relating to the identification card has not been validated.

28. The method as defined in claim 27, further including:

after validating the information, enabling the Player to input player tracking data through the keys of said keypad mechanism.

29. The method as defined in claim 27, further including:

after the validating the information, tracking the Player's game play on the gaming device.

30. The method as defined in claim 27, wherein each illumination device is provided by a multi-Light Emitting Diode (LED), and the back lighting of the keys include illuminating the multi-color LED in one color in the first lighting mode, and illuminating the multi-color LED in another color in the second first lighting mode.

31. The method as defined in claim 30, further including:

after validating the information, enabling the Player to input player tracking data through the keys of said keypad mechanism.

32. The method as defined in claim 31, further including:

after the validating the information, tracking the Player's game play on the gaming device.

33. The method as defined in claim 27, wherein, the validating information includes sensing the proper insertion of the identification card in said card reader opening for reading thereof.

34. The method as defined in claim 33, wherein, said validating information further includes reading an identification code encoded on said identification card, and further including:

comparing said identification code to a predetermined code to determine the validation.

35. The method as defined in claim 34, further including:

collectively illuminating the illumination devices in a third lighting mode when no identification card is positioned in the card reader opening.

36. The method as defined in claim 27, wherein said illuminating includes illuminating a first illumination pattern of keys upon validation of the information relating to the identification card, and illuminating a second illumination pattern of keys upon invalidation of the information relating to the identification card.

37. A keypad assembly for use with a card reader configured to read a player identification card therein, said keypad assembly comprising:

a keypad mechanism having a plurality of backlit translucent keys to input data;

a feedback mechanism including a plurality of illumination devices each corresponding to a respective key for selective illumination thereof; and a validation device coupled to the feedback mechanism, and adapted to determine the validation of information relating to the identification card upon cooperation thereof with the card reader, said validation device further being operably coupled to the feedback mechanism to visually inform the Player in a collective first illumination pattern of illuminated keys that the information relating to the identification card has been validated, and a collective second illumination pattern of illuminated keys that the information relating to the identification card has not been validated.

38. The keypad assembly as defined in claim 37, wherein each said illumination device is provided by a Light Emitting Diode (LED).

39. The keypad assembly as defined in claim 38, wherein each said light emitting diode is a multi-color LED illuminating one color in the first illumination pattern and another color in the second illumination pattern.

40. The keypad assembly as defined in claim 37, wherein said information relating to the identification card includes the validation of an identification code input through the keys by the Player.

41. The keypad assembly as defined in claim 37, wherein said first illumination pattern is in the form of an "√" symbol, and said second illumination pattern is in the form of a "X" symbol.

42. The keypad assembly as defined in claim 37, wherein said information relating to the identification card includes the proper insertion into a card reader opening of the card reader for reading thereof.

43. The keypad assembly as defined in claim 37, wherein, said validation device includes a sensing device cooperating with the card reader to detect the proper insertion of the identification card in said card reader opening.

44. The keypad assembly as defined in claim 37, wherein said information relating to the identification card includes gaming establishment code information to verify use at selected establishments.

45. The keypad assembly as defined in claim 37, wherein, said validation device includes a microcontroller to control the animation of each light emitting diode in the first illumination pattern and the second illumination pattern.

46. The keypad assembly as defined in claim 45, wherein, said microcontroller further includes an attract mode which operates each light emitting diode in an attract sequence when no identification card is positioned in the card reader opening.

47. The keypad assembly as defined in claim 37, wherein said keys of the keypad mechanisms are arranged in a matrix.

48. A player tracking system for tracking Players of a plurality of gaming machines interconnected to a host computer comprising:

a player tracking device adapted to monitor the game play of a Player;

a card reader for reading a player identification card inserted in a card reader opening of the card reader;

a keypad mechanism having a plurality of backlit translucent keys to a input data for use in the player tracking device;

a plurality of illumination devices each corresponding to a respective key for selective illumination thereof;

a validation device adapted to determine the validation of the information relating to the identification card upon cooperation thereof with the card reader, said validation device further being operably coupled to the plurality of illumination devices to visually inform the Player in a collective first illumination pattern of illuminated keys that the information relating to the identification card has been validated, and a collective second illumination pattern of illuminated keys that the information relating to the identification card has not been validated.

49. The player tracking system as defined in claim 48, wherein each said illumination device is provided by a multi-color Light Emitting Diode (LED) illuminating one color in the first illumination pattern, and illuminating another color in the second illumination pattern.

50. The player tracking system as defined in claim 49, wherein said validation device includes a sensing device cooperating with the card reader to detect the proper insertion of the identification card in said card reader opening.

51. The player tracking system as defined in claim 50, wherein, said validation device includes a microcontroller to control the animation of each LED in the first illumination pattern and the second illumination pattern.

52. The player tracking system as defined in claim 51, wherein, said microcontroller further includes an attract mode which operates each LED in an attract sequence during non-use of the card reader.

53. The player tracking system as defined in claim 48, wherein said information includes the validation of an identification code input through the keys by the Player.

54. The player tracking system as defined in claim 48, wherein said keys of the keypad mechanisms are arranged in a matrix.

55. The player tracking system as defined in claim 48, wherein said first illumination pattern is in the form of an "√" symbol, and said second illumination pattern is in the form of a "X" symbol.

* * * * *